UNITED STATES PATENT OFFICE.

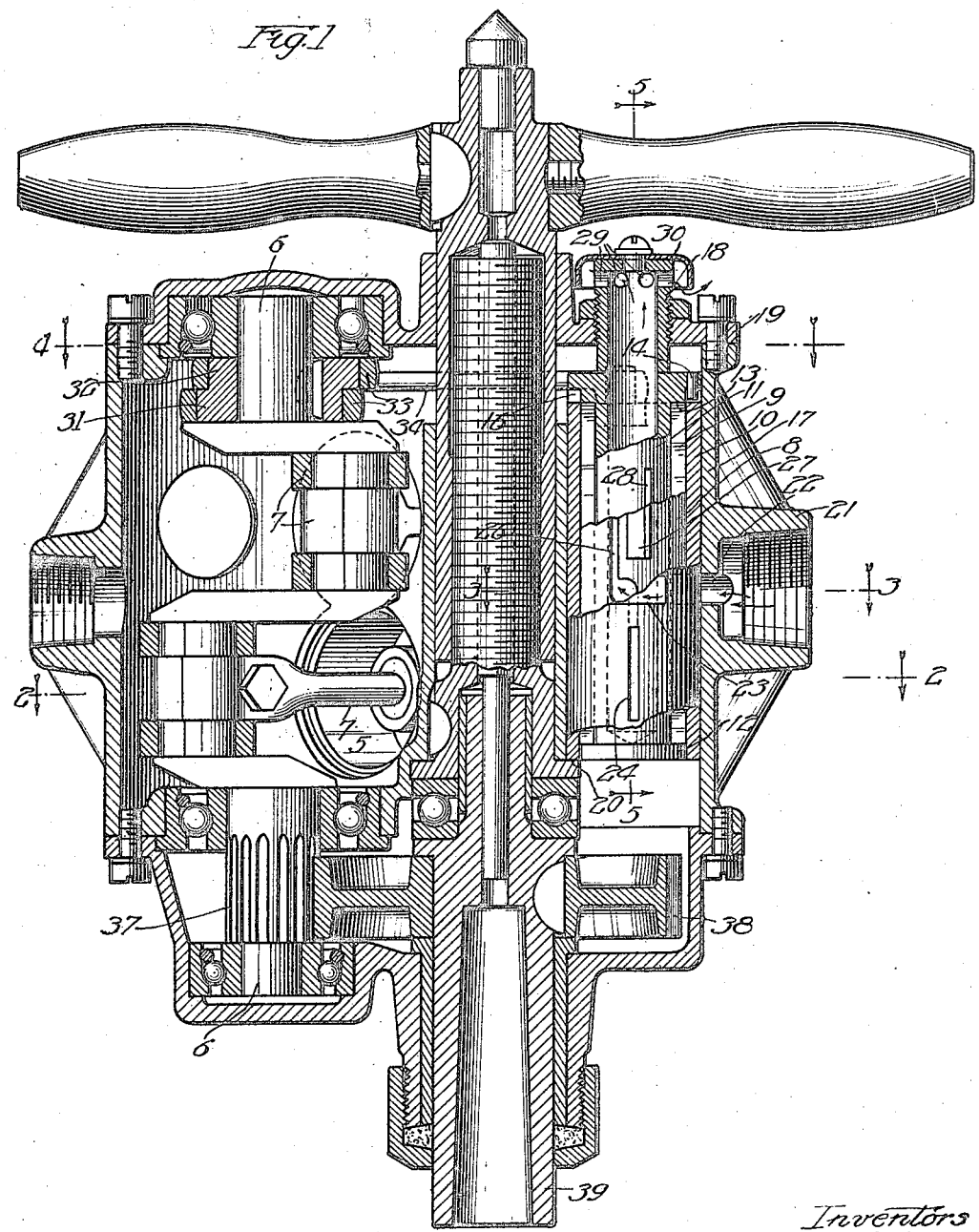

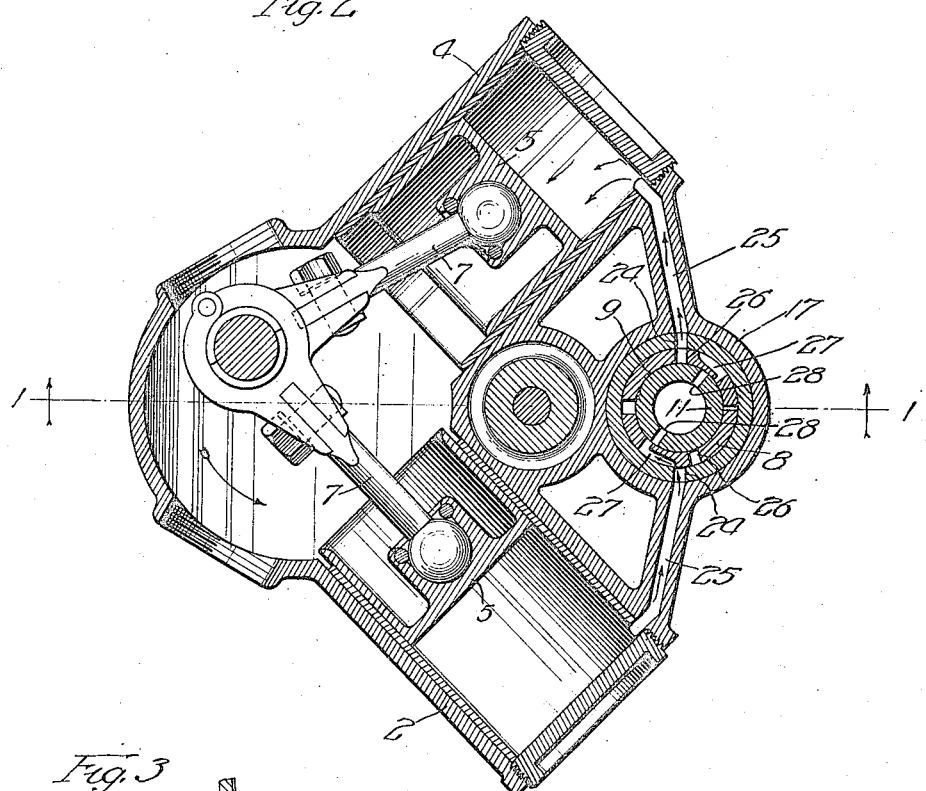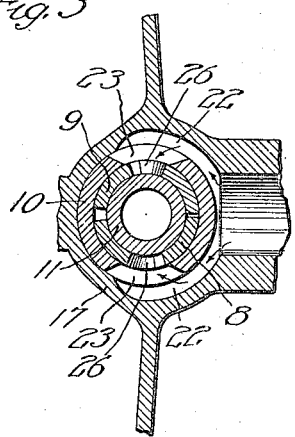

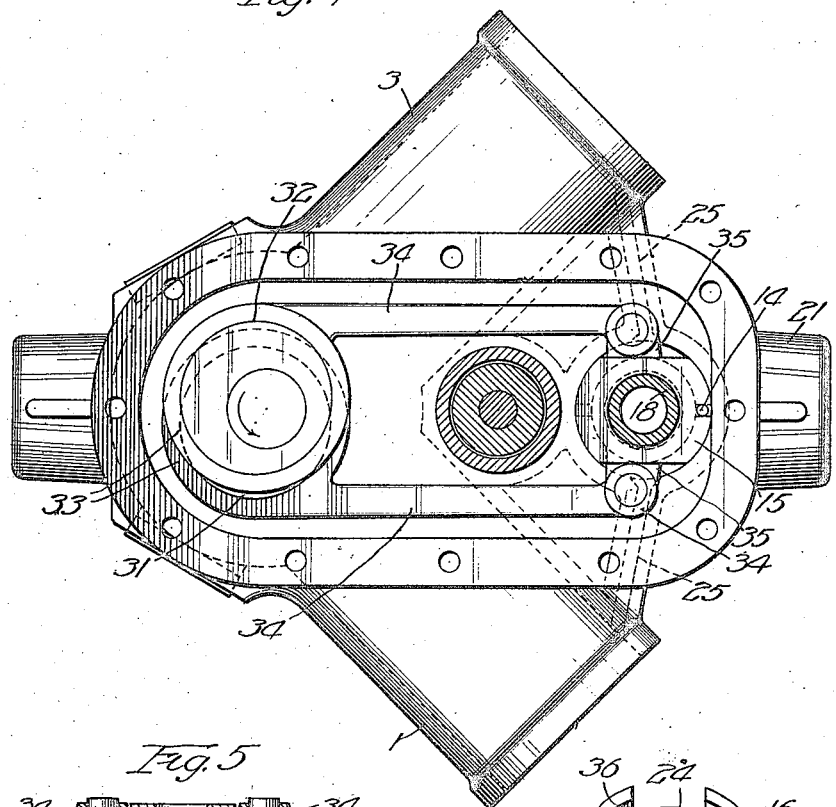
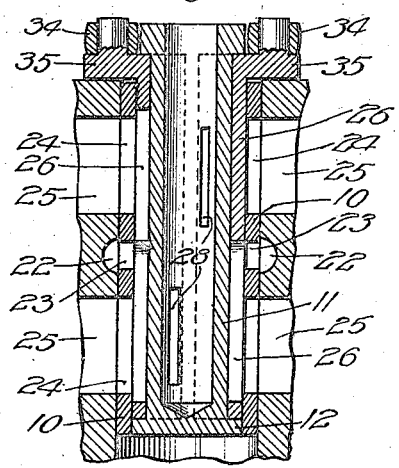
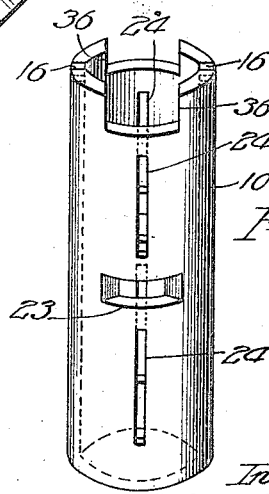

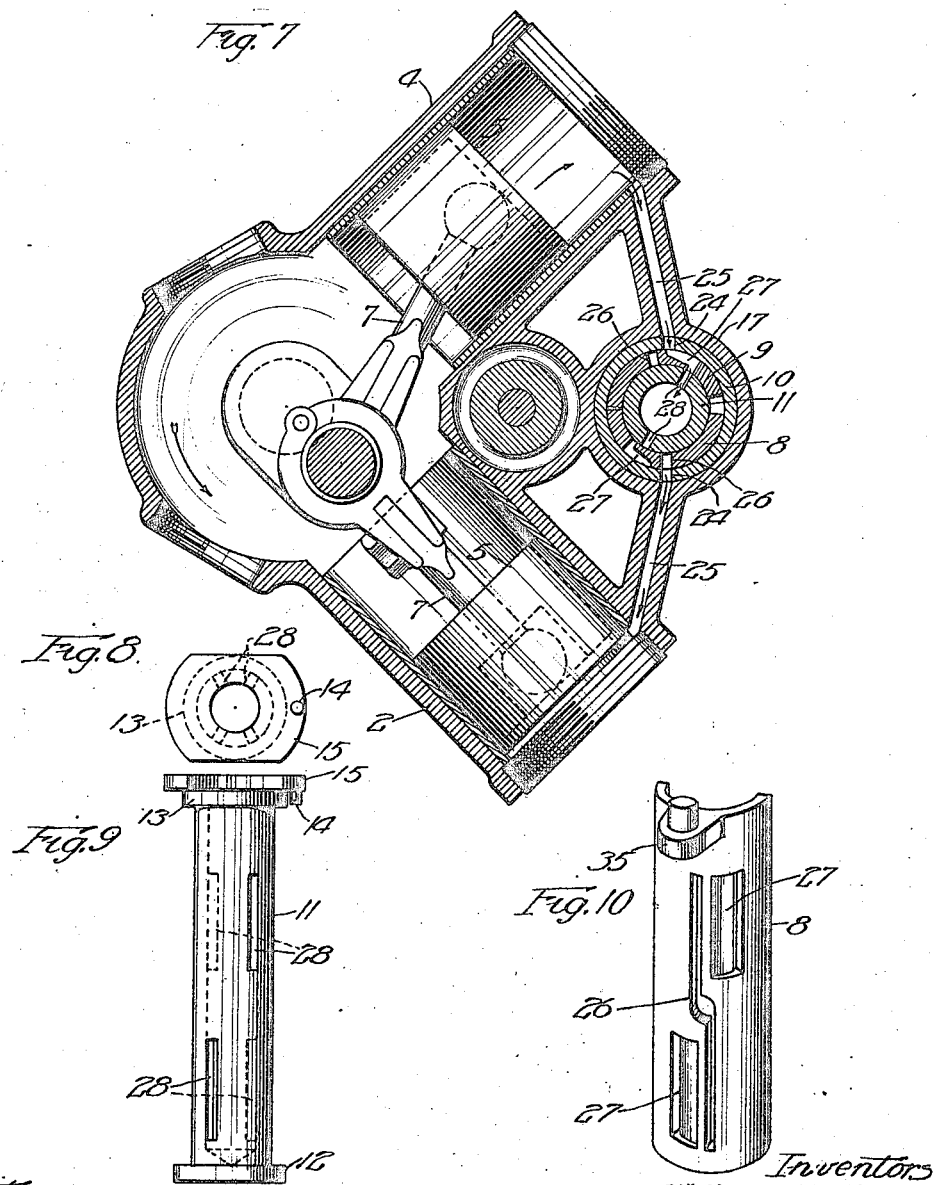

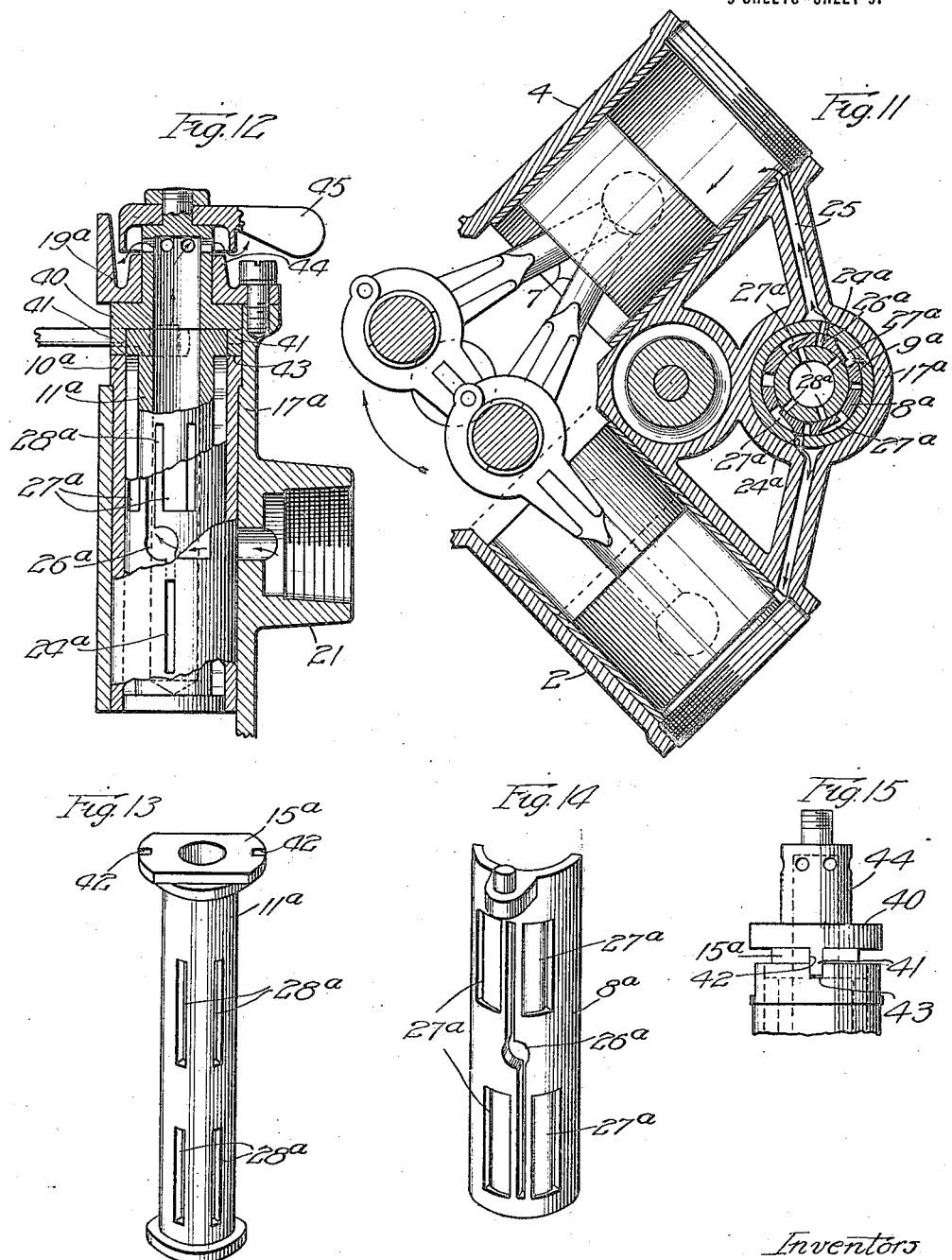

WILLIAM H. KELLER, MAX MAXIMILIAN, AND ALBERT SCHINKEZ, OF GRAND HAVEN, MICHIGAN, ASSIGNORS TO WILLIAM H. KELLER, INC., OF GRAND HAVEN, MICHIGAN, A CORPORATION OF MICHIGAN.

FLUID-PRESSURE MOTOR.

1,427,157.   Specification of Letters Patent.   Patented Aug. 29, 1922.

Application filed April 15, 1918. Serial No. 228,570.

*To all whom it may concern:*

Be it known that we, WILLIAM H. KELLER, MAX MAXIMILIAN, citizens of the United States, and ALBERT SCHINKEZ, a subject of the Emperor of Austria, all residing at Grand Haven, in the county of Ottawa and State of Michigan, have invented certain new and useful Improvements in Fluid-Pressure Motors, of which the following is a specification.

This invention relates particularly to valve mechanism for fluid-pressure motors of the type used, for example, in portable drills and the like, wherein extreme simplicity, lightness and speed are of prime importance. In motors of this type, it is common to employ two sets of cylinders, the cylinders being arranged at an angle to each other, and the pistons of all of the cylinders being connected to a single crank shaft. In prior constructions, two separate valve mechanisms or units have been provided, there being one valve unit for each set of cylinders. Each such valve unit has included an oscillatory cylindrical valve plug which necessarily is relatively heavy, and hence is ill-suited to rapid oscillation.

The primary object of this invention is to simplify, lighten and cheapen the construction of valve mechanisms for motors of the type above referred to. This object we attain by employing a single valve unit capable of controlling the flow of motive fluid to and from all of the cylinders, said unit comprising a plurality of segmental or arcuate valve members which are relatively light and hence well adapted for high-speed operation with a minimum amount of power for their actuation.

Another object is to provide improved means for reversing the direction of rotation of the crank-shaft.

Further objects and advantages will be apparent from the following description of one embodiment of the invention.

In the accompanying drawings, Figure 1 is a longitudinal sectional view of an apparatus embodying the features of our invention, the view being taken in the plane of dotted line 1—1 of Fig. 2. Fig. 2 is a section on line 2—2 of Fig. 1. Fig. 3 is a fragmental sectional view on line 3—3 of Fig. 1. Fig. 4 is a section on line 4—4 of Fig. 1. Fig. 5 is a sectional view taken in the plane of line 5—5 of Fig. 1. Fig. 6 is a perspective view of one of the valve elements. Fig. 7 is a sectional view similar to Fig. 2, but showing a different position of the valve mechanism. Fig. 8 is an end view of one of the valve elements. Fig. 9 is a side view of said element. Fig. 10 is a perspective view of one of the valve members. Fig. 11 is a view of a reversible motor embodying my invention. Fig. 12 is a sectional view of the valve mechanism of said reversible motor. Figs. 13 and 14 are perspective views of certain valve parts. Fig. 15 is a fragmentary section of a portion of the valve mechanism.

The embodiment which has been selected to illustrate the invention comprises a framework or casing containing two sets of cylinders, each set consisting of two parallel cylinders arranged side by side, and the two sets being arranged at right angles to each other. The cylinders of one set are indicated at 1 and 2. 3 and 4 are the cylinders of the other set. The pistons 5 are connected to the crank shaft 6 by means of piston rods 7.

The means for controlling the flow of motive fluid to and from the cylinders comprises a single valve mechanism located, in the present embodiment, in the angle formed between the two sets of cylinders, the valve members oscillating upon a single axis extending parallel with the axis of the crank shaft. Said valve members are indicated at 8 and 9 and are of segmental or arcuate form. The valve member 8 controls the admission and exhaust of motive fluid to and from the cylinders 1 and 2, while the valve member 9 performs a similar function with respect to the set of cylinders 3 and 4.

The valve members 8 and 9 are mounted in a valve chamber formed by an outer sleeve 10 and an interior sleeve 11. The annular chamber formed between the two concentric sleeves 10 and 11 is closed at its opposite ends by means of flanges 12 and 13 on the sleeve 11, said flanges fitting within the ends of the sleeve 10. See Figs. 1, 5 and 9.

Any suitable means may be employed to maintain the sleeves 10 and 11 in fixed relation to each other. The means herein shown for this purpose comprises a key or projection 14 (Figs. 1 and 9) on the head 15 of the sleeve 11, said key being adapted to fit within either one of two slots 16 on the end of the sleeve 10. The sleeve 10 fits within a casing 17 in the motor framework. When the motor is not intended to be reversible, the sleeve 10 is stationary, being driven into the casing 17. The sleeve 11 is held against endwise displacement by means of a tubular screw 18 (Fig. 1) which is seated in the cover or end plate 19 of the framework, which screw bears against the head 15 and holds the flange 12 against a stationary shoulder 20 (Fig. 1).

Motive fluid is supplied to the valve mechanism by any suitable means, as, for example, a hose or tube (not shown) connected to a nipple 21, said nipple communicating with a passage 22 (Fig. 3), which extends partially around the sleeve 10. Diametrically opposite ports 23 in the sleeve 10 communicate with the inlet passage 22. Above and below the ports 23 are ports 24 in the sleeve 10, which ports 24 communicate with passages 25 leading to the cylinders 1, 2, 3 and 4.

Each of the oscillatory valve members 8 and 9 has a longitudinally extending inlet port 26, the enlarged middle portion of which is arranged to register with the inlet port 23. The inlet ports 26 are also arranged to register with the ports 24 for the purpose of admitting motive fluid to the cylinders.

The motive fluid exhausts from the cylinders through the passages 25 and the ports 24, through ports 27 in the valve members 8 and 9 and through ports 28 in the sleeve 11, passing through said sleeve and the tubular screw 18 to exhaust openings 29 in said screw. 30 is an exhaust-deflecting cap secured to the screw 18.

The means herein shown for oscillating the valve members 8 and 9 comprises two eccentrics 31 and 32 (Fig. 1) mounted upon the crank shaft 6, the straps 33 of said eccentrics being integral with rods 34 (Fig. 4) which are pivoted to arms 35 (Fig. 5) on the valve members. The arms 35 extend through openings 36 (Fig. 6) in the outer sleeve 10.

Power may be communicated in any suitable way from the crank shaft 6 to the element to be driven. Herein the shaft is shown as having a pinion 37 (Fig. 1) meshing with a spur gear wheel 38 on the tool socket 39.

The valve members 8 and 9 are preferably formed from an integral sleeve, said sleeve being cut longitudinally into two pieces. The valve members are exactly alike and hence interchangeable. In Figs. 11 to 15 we have illustrated a motor similar to the one shown in Figs. 1 to 10, save that it is made reversible. The valve members 8ª and 9ª and the sleeve 11ª are provided with two sets of exhaust ports 27ª and 28ª, respectively; and the sleeves 10ª and 11ª are made rotatably adjustable to allow either set of exhaust ports 27ª to register with the ports 24ª and 28ª. The sleeves 10ª and 11ª are rotatably mounted in the casing 17ª, said sleeves being connected together by means of a head 40 that overlies the head 15ª. The head 40 has two diametrically opposite lugs 41 that lie in notches 42 and 43 in the head 15ª and the sleeve 10ª, respectively. The head 40 has a tubular stem 44 that communicates with the bore of the sleeve 11ª and is rotatably mounted in the end plate or cover 19ª. Secured to the stem 44 is a handle 45.

It will be seen that we have produced a unitary valve mechanism which is exceedingly simple and which is capable of controlling two sets of cylinders. The valve mechanism consists of a minimum of parts which may be conveniently assembled, inserted into and withdrawn from the machine. The valve members 8 and 9 are relatively light and hence require little power for their actuation.

We would have it understood that the invention is not limited to the construction herein shown, as various modifications may be made within the scope of the appended claims.

We claim as our invention:

1. A motor having, in combination, two cylinders arranged at an angle to each other, a casing located in the angle between the cylinders, means providing passageways connecting said casing to both of the cylinders, said casing having two diametrically opposite inlet ports, a sleeve extending concentrically within said casing and forming an annular chamber in the casing, said sleeve having two exhaust ports therein, two segmental valve members mounted in said annular chamber, each of said valve members having an inlet port and an exhaust port adapted to register alternately with one of said passageways, the inlet ports of the valve members being arranged to communicate with the respective inlet ports of the casing, and the exhaust ports of the valve members being arranged to communicate with the respective exhaust ports of said sleeve, and means for oscillating said valve members.

2. A motor having, in combination, two cylinders, a casing, means providing passageways connecting said casing to both of the cylinders, said casing having two diametrically opposite inlet ports, a sleeve extending concentrically within said casing and forming an annular chamber in the casing, said sleeve having two exhaust ports therein, two segmental valve members mounted in said annular chamber, each of said valve members having an inlet port and an exhaust port adapted to register alternately with one of said passageways, the inlet ports of the valve members being arranged to communicate with the respective inlet ports of the casing and the exhaust ports of the valve members being arranged to communicate with the respective exhaust ports of said sleeve, and means for oscillating said valve members.

3. A motor having, in combination, two cylinders, means providing an annular valve chamber, means providing passageways connecting said chamber to both of the cylinders, said chamber having two inlet ports and two exhaust ports, two segmental valve members mounted in said annular chamber, each of said valve members having an inlet port and an exhaust port adapted to register alternately with one of said passageways, the inlet ports of the valve members being arranged to communicate with the respective inlet ports of the chamber and the exhaust ports of the valve members being arranged to communicate with the respective exhaust ports of the chamber, and means for oscillating said valve members.

4. A motor having, in combination, two cylinders, means providing an annular valve chamber connected at opposite sides to said cylinders, said annular chamber having inlet means and exhaust means, two segmental valve members mounted in said annular chamber, each of said valve members having an inlet port and an exhaust port, and means for oscillating said valve members.

5. A motor having, in combination, two cylinders, arranged at an angle to each other, means in the angle between the cylinders providing a single valve chamber connected at opposite sides to said cylinders, said chamber having inlet means and exhaust means, movable means in said chamber for controlling communication between the cylinders and said inlet and exhaust means, and means for actuating said movable means.

6. A motor having, in combination, a cylinder, an arcuate valve member, means providing a valve chamber having concentric walls between which said valve member is slidably mounted, said chamber having an inlet connection, an exhaust connection and a connection to the cylinder, said valve member being arranged to control said connections, and means for oscillating said valve member, said arcuate valve member being segmental whereby a plurality of valve members may be housed in a single valve chamber.

7. A portable fluid-actuated motor having, in combination, two cylinders arranged at an angle to each other, pistons in said cylinders and a crank shaft connected to both pistons, a single valve unit located in the angle between the cylinders and having an annular valve chamber, said unit comprising two arcuate valve members mounted in said chamber and oscillatory upon a common axis extending parallel with the crank shaft, and connections between the crank shaft and the valve unit for oscillating said valve members.

8. A fluid-actuated motor having, in combination, two cylinders arranged at an angle to each other, pistons in said cylinders, a crank shaft connected to both pistons, a single valve unit located in the angle between the cylinders and comprising two valve members oscillatory upon a common axis extending parallel with the crank shaft, and connections between the crank shaft and the valve unit for oscillating said valve members.

9. A valve unit having, in combination, two concentric sleeves providing an annular chamber between them, a plurality of segmental valve members mounted for oscillation in said chamber, and motive-fluid-supplying means connected to the outer sleeve, the bore of the inner sleeve constituting an exhaust passage.

10. A valve unit having, in combination, two concentric sleeves providing an annular chamber between them, a plurality of segmental valve members mounted for oscillation in said chamber, motive-fluid-supplying means connected to one of the sleeves, and exhaust means connected to the other sleeve.

11. A fluid-actuated motor having, in combination, two cylinders arranged at an angle to each other, pistons in said cylinders, a crank shaft connected to both pistons, a single valve unit located in the angle between the cylinders and comprising two valve members oscillatory upon a common axis extending parallel with the crank shaft, each of said valve members having two sets of ports, said valve unit including adjustable means to bring either set of ports into use, and connections between the crank shaft and said valve members for oscillating the latter.

12. A fluid-actuated motor having, in combination, two cylinders, pistons in said cylinders, a crank shaft connected to both pistons, a single valve unit comprising two valve members oscillatory upon a common axis extending parallel with the crank shaft, each of said valve members having two sets of ports, said valve unit including adjustable means to bring either set of ports into use, and connections between the crank shaft and said valve members for oscillating the latter.

13. A valve unit having, in combination, two concentric sleeves providing an annular chamber between them, a plurality of segmental valve members mounted for oscillation in said chamber, each member having two sets of ports, motive-fluid-supplying means communicating with one of the sleeves, the other sleeve having two sets of exhaust ports, said sleeves being adjustable to bring into use either set of ports in the valve members.

14. A valve unit having, in combination, means providing an annular valve chamber, a valve member in said chamber, said member having two sets of ports, motive-fluid-supplying means communicating with said chamber, said chamber having two sets of exhaust ports, and means for adjusting said chamber to bring into use either set of exhaust ports, whereby the cycle of operation of said valve member is reversed.

15. A fluid actuated motor having, in combination, two cylinders, a single valve unit comprising two valve members oscillating on a common axis, each of said valve members having inlet and exhaust ports for operating the motor in one direction and inlet and exhaust ports for operating the motor in the opposite direction, adjustable means for bringing either set of ports into use, said ports being so arranged that a single inlet passage serves as inlet port for both sets of ports, and means for oscillating said valve members.

16. A valve unit having, in combination, two concentric sleeves providing an annular chamber between them, a segmental valve member mounted for oscillation in said chamber, motive fluid supplying means connected to one of the sleeves, and exhaust means connected to the other sleeve.

17. A motor having, in combination, a shaft having a pair of cranks arranged approximately 180 degrees apart, a plurality of cylinders arranged in sets of two each, one for each crank and arranged parallel to each other, the cylinders of the respective sets being arranged substantially at right angles with respect to each other, a chamber in the angle between the cylinders, passages extending from the chamber to the cylinders, reciprocatory means for automatically controlling said passages to operate the motor, and manual means associated with the chamber for rearranging the connections between said passageways to reverse the direction of operation of the motor.

In testimony whereof we have hereunto set our hands.

WILLIAM H. KELLER.
MAX MAXIMILIAN.
ALBERT SCHINKEZ.